JOHN FEGER ANCONA & JOHN FLINN ANCONA.
READING DEVICE.
APPLICATION FILED MAY 13, 1913.
1,165,219.
Patented Dec. 21, 1915.
5 SHEETS—SHEET 3.
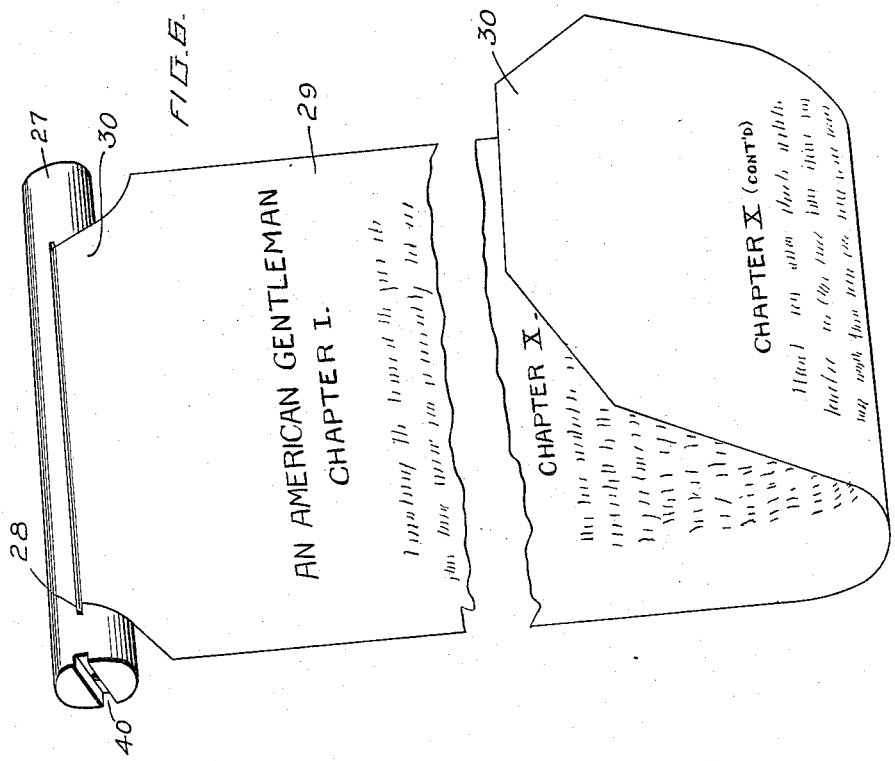
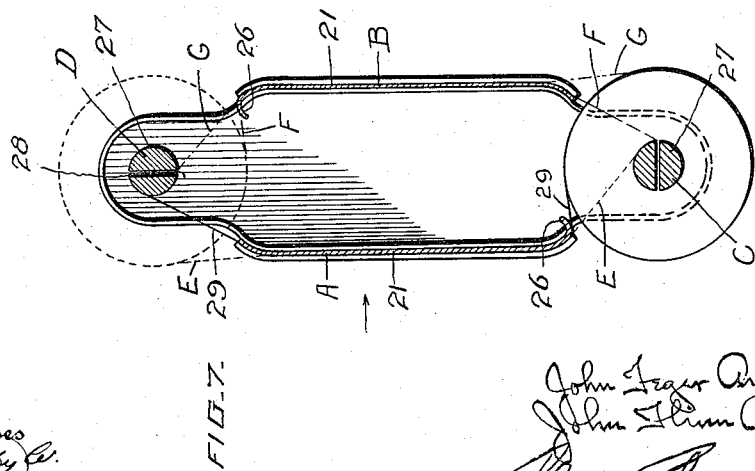

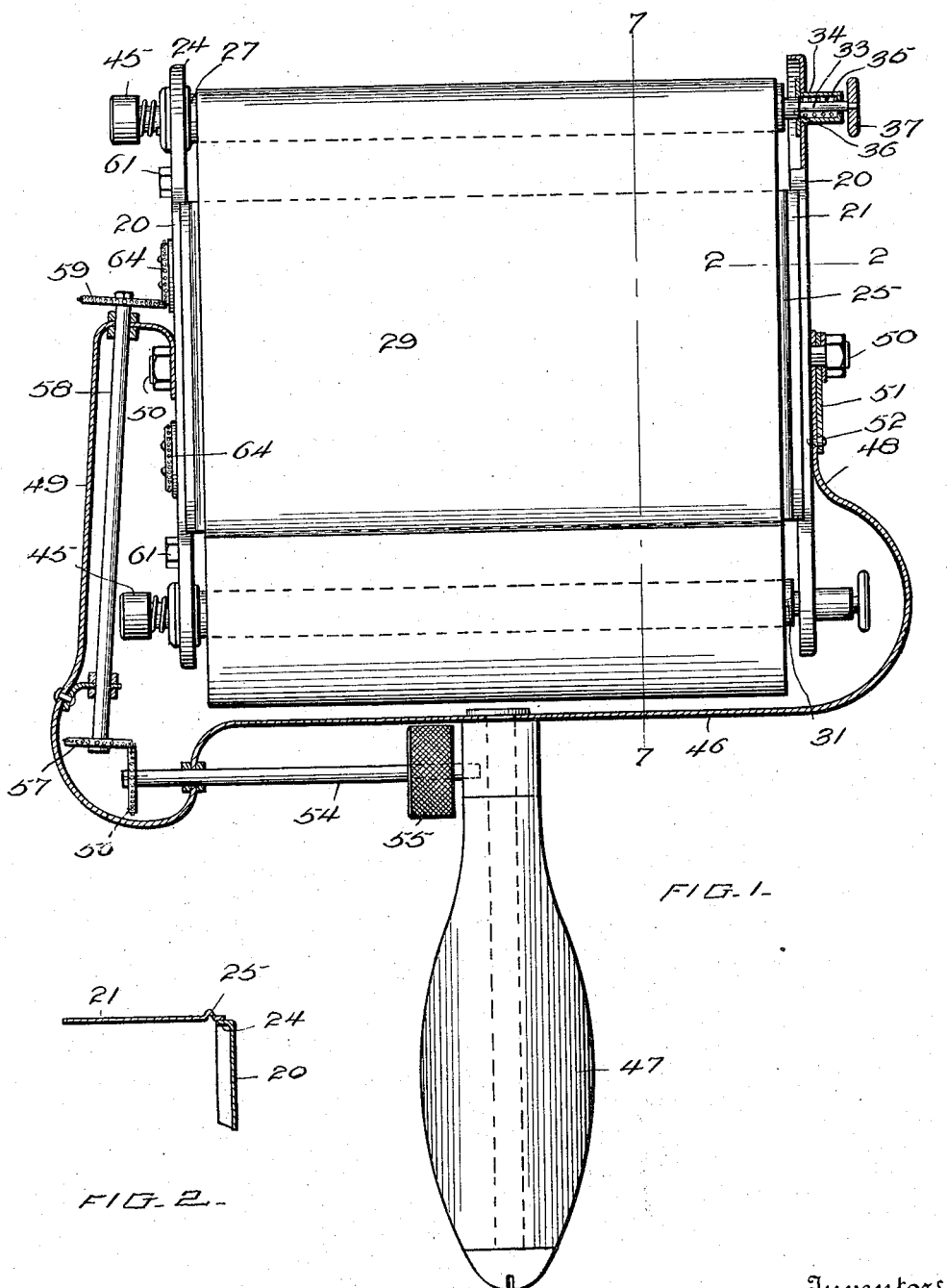

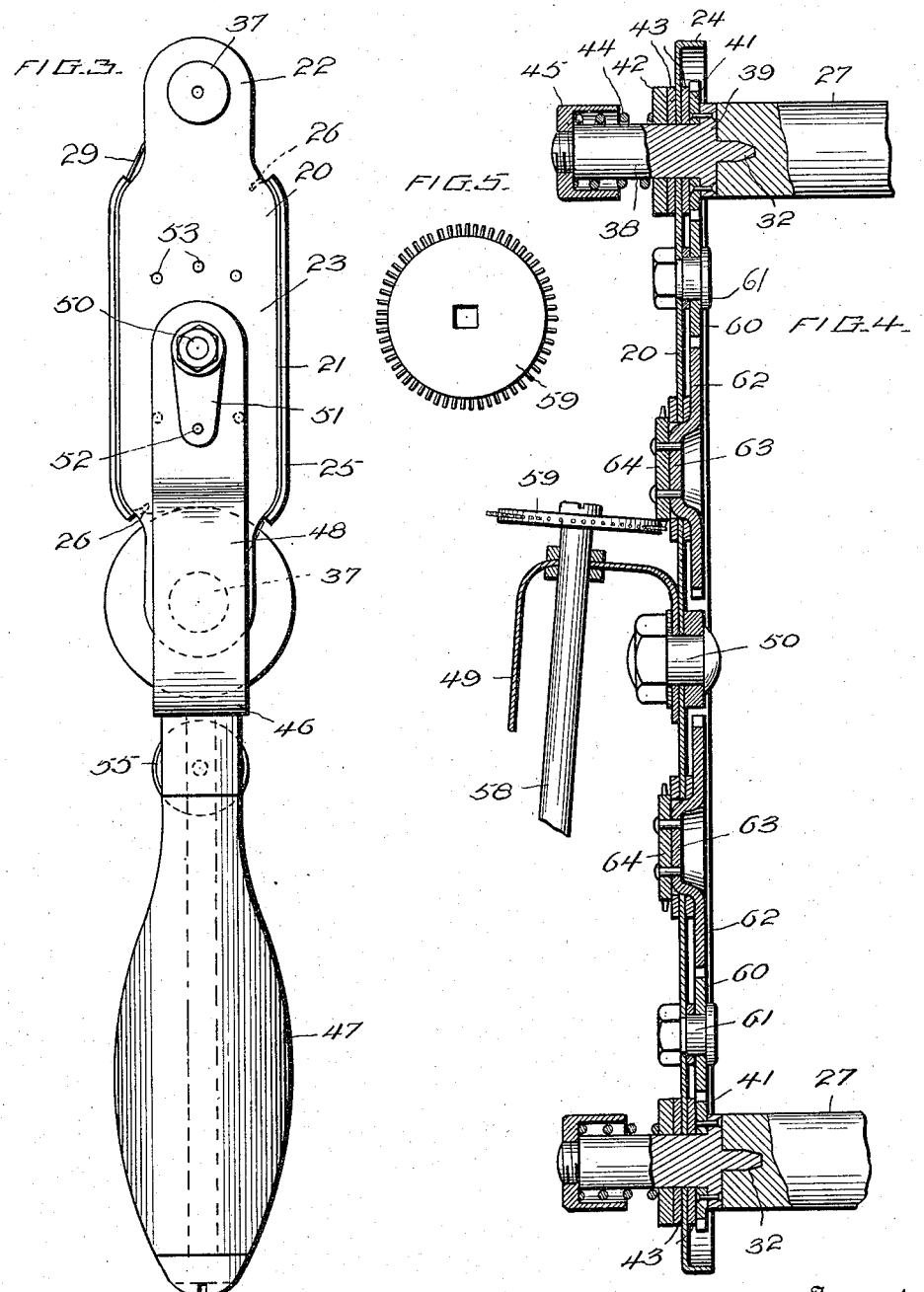

JOHN FEGER ANCONA & JOHN FLINN ANCONA.
READING DEVICE.
APPLICATION FILED MAY 13, 1913.
1,165,219.
Patented Dec. 21, 1915.
5 SHEETS—SHEET 4.
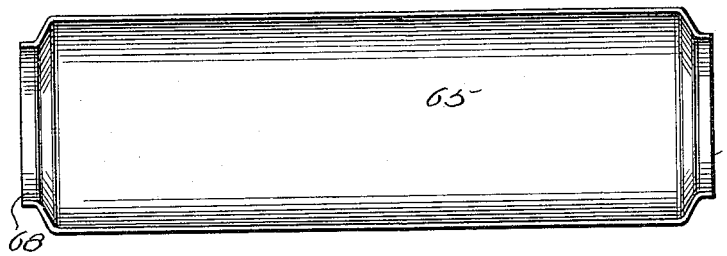
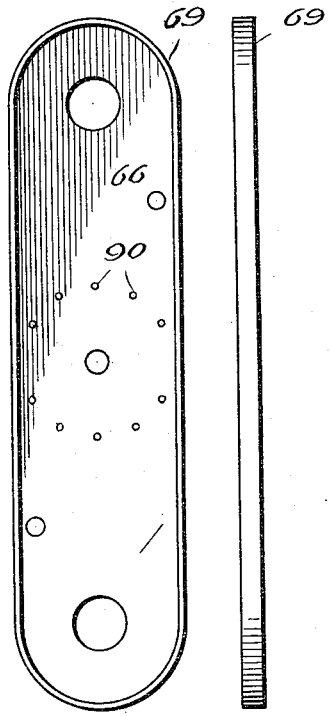
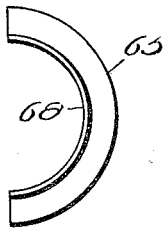
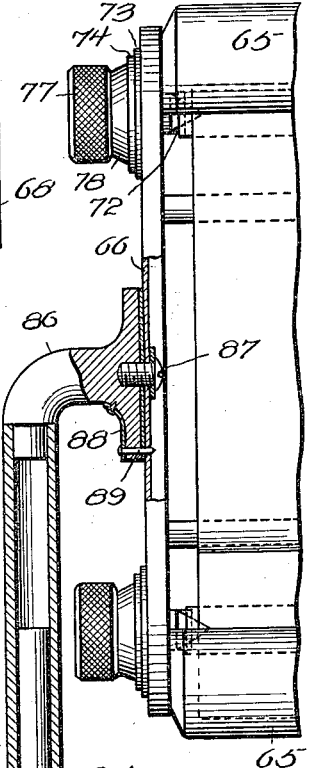
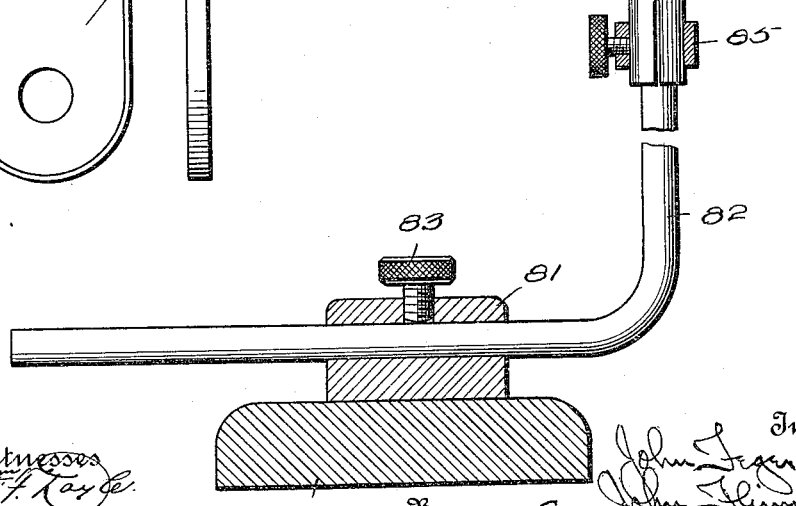

JOHN FEGER ANCONA & JOHN FLINN ANCONA.
READING DEVICE.
APPLICATION FILED MAY 13, 1913.
1,165,219.
Patented Dec. 21, 1915.
5 SHEETS—SHEET 5.
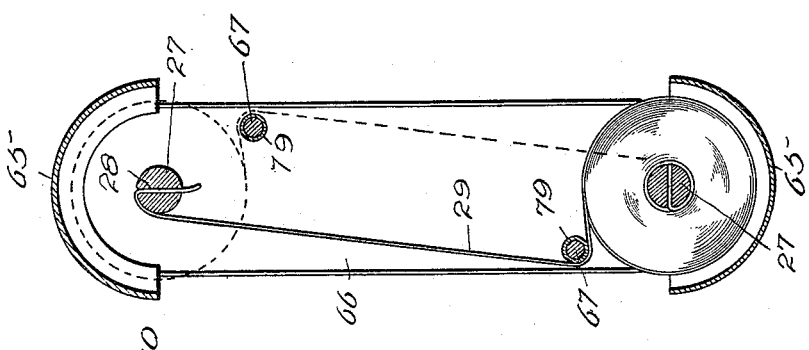
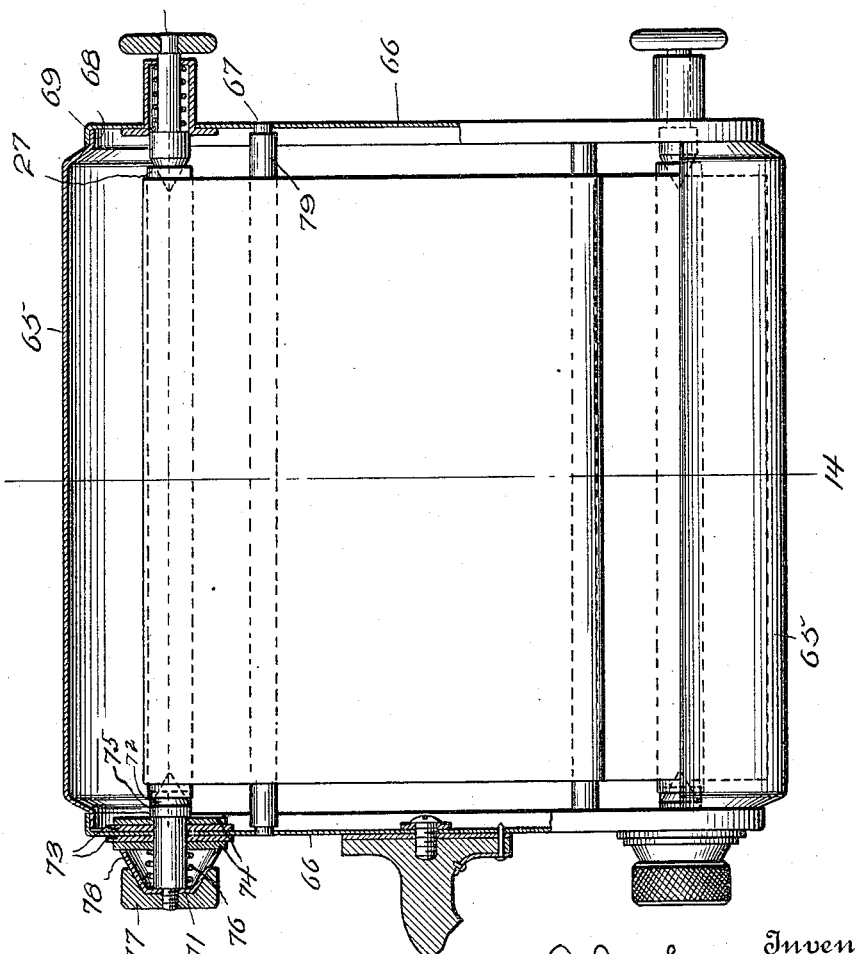

UNITED STATES PATENT OFFICE.

JOHN FEGER ANCONA, OF READING, PENNSYLVANIA, AND JOHN FLINN ANCONA, OF ROCHESTER, NEW YORK.

READING DEVICE.

1,165,219.  Specification of Letters Patent.  Patented Dec. 21, 1915.

Application filed May 13, 1913. Serial No. 767,326.

*To all whom it may concern:*

Be it known that we, JOHN FEGER ANCONA and JOHN FLINN ANCONA, citizens of the United States, residing, respectively, at Reading, in the county of Berks and State of Pennsylvania, and Rochester, in the county of Monroe and State of New York, have invented certain new and useful Improvements in Reading Devices, of which the following is a specification, reference being had therein to the accompanying drawings.

This invention relates to an improved system of publication, disposition and presentation of reading matter, particularly light fiction and the like, and has for its general objects to reduce the cost of publication, to diminish the bulk of the published work, and to present the matter to the reader in a convenient and attractive form.

These and other more particular objects of the invention, together with means whereby the same may be carried into effect, will best be understood from the following description of certain forms or embodiments thereof illustrated in the accompanying drawings. It will be understood however that the particular constructions and arrangements described and shown have been chosen for illustrative purposes merely, and that the invention may be otherwise embodied and practised without departing from the spirit and scope thereof.

In said drawings: Figure 1 is a front elevation, partly in section, of one form of reading frame, showing the reading matter rolls in place therein; Fig. 2 is a detail section on the line 2—2, Fig. 1; Fig. 3 is a side elevation of the device shown in Fig. 1; Fig. 4 is an enlarged sectional view of a portion of the roll operating mechanism at the left side of the frame shown in Fig. 1; Fig. 5 is a detail view of one of the gears of the roll operating mechanism; Fig. 6 is a perspective view of the reading strip and one of the rollers, showing the construction of the roller and the manner of attaching the strip thereto, and also illustrating the arrangement of the reading matter on the strip; Fig. 7 is a diagrammatic sectional view, substantially on the line 7—7, Fig. 1, illustrating the reversal of the winding of the strip; Fig. 8 is an elevation, partly in section, of a modified construction, only a portion of the reversible frame being shown; Fig. 9 is an inside plan view and Fig. 10 an end elevation of one of the top and bottom members of the frame shown in Fig. 6; Fig. 11 is a side elevation and Fig. 12 an edge view of one of the end members of the frame shown in Fig. 6; Fig. 13 is a complete side elevation, partly in section, of the reversible frame shown in Fig. 8; and Fig. 14 is a section on the line 14—14, Fig. 13.

In accordance with the invention the reading matter is printed upon a single continuous strip of paper or the like which, for storage purposes and in use, is rolled upon a roller or spool. The lines of reading matter preferably run crosswise of the strip, which is printed upon both sides, the reading matter being oppositely disposed on the opposite sides of the strip. In other words said reading matter may be considered to run downwardly upon one side of the strip and in the opposite direction on the other, so that in reading when the lower end of the first side of the strip is reached said end may be turned upwardly, or the strip as a whole turned end for end, and the reading matter will continue on the opposite side of the strip, the lower end of the first side becoming the upper end of the second side, as clearly shown in Fig. 6.

The rolls of reading matter, or the spools containing the strips, are, for the purpose of presentation to the reader, detachably mounted in a reversible frame which is preferably mounted in a suitable holder, the strip being gradually reeled off from the spool upon which it is originally stored upon a similar, initially empty spool, the reading progressing until the end of the strip is reached, whereupon the frame is reversed, the strip gradually reeled back upon the first spool, and the opposite side read.

A preferred construction of reading frame in which rolls of reading matter of the character above described may be used is illustrated in Figs. 1 to 5. As shown in said figures the reversible frame comprises end members 20 connected by combined guiding and backing plates 21. The end members as shown are formed with reduced upper and lower ends 22 (see Fig. 3) in which the strip carrying rolls or spools are journaled, as hereinafter more fully explained, and with relatively broad central portions 23. Said end members are further formed with inturned flanges 24 extending entirely around the edges thereof, and to the portions of the flanges 24 opposite the central portions 23 of said end members the backing plates 21 are suitably secured, as by brazing or otherwise. Adjacent their ends the plates 21 are formed with vertically extending beadings or ribs 25 for the purpose of guiding the strip in its passage from one spool to to the other. The upper and lower edges of the plates 21 are preferably curved inwardly, as indicated at 26 in Fig. 3 (see also Fig. 7), to form a smooth guiding surface for the paper strip.

The spools or rollers comprise preferably wooden cores 27 provided at their central portions with diametrically arranged slots 28 in which the ends of the reading strip 29 may be inserted and detachably held. To facilitate the attachment of the strip to the rollers the ends 30 of said strip are preferably tapered as shown in Fig. 6. The rollers 27, of which two are employed, are detachably held in the frame between centers 31 and 32 which are exactly similar for each roll.

The centers 31 comprise reduced or tapered ends of plungers or sliding pins 33 which slide in bushings 34 secured in place in one of the end members 20. The rollers 27 are formed at one end with centrally located recesses to receive the centers 31, which are held in said recesses by means of springs 35 interposed between the outer ends of the bushings 34 and shoulders 36 on the plungers 33. Said pins or plungers 33 are preferably provided at their outer ends with handles 37 by means of which they may be withdrawn against the tension of the springs 35 to release the rollers 27, thereby permitting said rollers to be removed from the frame.

The centers 32 comprise projections on short shafts 38 which are rotatably mounted in the end member 20 opposite that carrying the plungers 33, said centers 32 entering centrally located recesses in the corresponding ends of the rollers 27. Adjacent the centers 32 the shafts 38 are provided with dogs 39 in the form of transversely arranged projections or lugs which enter slots 40 (see Fig. 6) in the corresponding ends of the rollers 27, and by means of which said rollers are connected with the shafts 38 so as to turn therewith.

41 denotes disks (herein, for a purpose presently to be explained, shown as gears) secured to the shafts 38 within the adjacent end member 20, as by means of rivets passing through said disks and the dogs 39.

42 denotes metallic washers slidably mounted on the shafts 38 outside the end member 20, and 43 friction washers located on opposite sides of said end member between the disks 41 and washers 42.

44 denotes springs interposed between the washers 42 and abutments 45 (herein shown as thumb nuts) secured to the outer ends of the studs 38. The springs 44 hold the friction washers 43 in close engagement with the opposite sides of the end member 20, thereby frictionally holding the shafts 38 and rollers 27 against too free rotation, and providing for a light tension upon the strip extending between the two rollers, so that said strip will be held taut.

The operation of the device is diagrammatically illustrated in Fig. 7, the arrow adjacent said figure indicating the line of vision of the reader, or the direction from which the device is viewed. A roll of strip upon a spool or roller 27 is placed in position between the lower centers 31 and 32 of the frame, the corresponding pin 33 being withdrawn to permit the insertion of the roll, and the corresponding dog 39 being engaged with the slot 40 in the end of the roller or spool. This spool or roller is designated by C in said Fig. 7. An empty roller or spool (designated by D) is similarly placed in position between the upper centers 31 and 32. The outer end of the strip 29 is drawn upwardly outside the corresponding side member 21 (designated by A) and inserted in the slot 28 of the upper roller D, the strip being then in the position shown in full lines with the upper or outer end of the strip at the front as indicated by the arrow. The upper roller D is then gradually turned, causing the strip to move upwardly over the side member A, where it may be conveniently read during its passage, said strip being gradually unwound from the lower roller C and gradually wound up upon the upper roller D until said strip occupies the position indicated by the line E. The lower end of the strip is then disengaged from the lower roller C, is passed backwardly and over the side member 21 indicated by B on Fig. 7, and is again reëngaged with the roller C, said strip then occupying the position indicated by the line F. The frame is thereupon reversed or turned upside down, bringing the side B to the front and the roller C to the top, whereupon said roller C is turned to feed the strip in the opposite direction and permit the opposite side thereof to be read, the strip being finally wound up upon the roller C as indicated by the line G. During the foregoing operations it will be seen that the side members 21 with their guiding edges 26 and guide ribs 25 (which engage the edges of the strip) perform the double function of guiding the strip in its passage from one roll to the other and of furnishing an opaque backing for said strip, permitting a relatively thin and light paper to be used.

In using the frame as above described it will be obvious that said frame may be held directly in the hand and the rollers turned by direct manipulation of the thumb nuts 45. In Figs. 1, 3 and 4, however, is shown a preferred form of holder for the reversible frame by which said frame may be conveniently held in any desired position and may be readily reversed, as is necessary in use, said holder being provided with operating mechanism by means of which the proper roller 27 may be conveniently turned in order to effect the feed of the strip. Said holder comprises a yoke 46 provided with a handle 47 and having arms 48 and 49 between which the reversible frame is pivoted by means of bolts 50 which pass through said arms and through the end members of the frame. 51 denotes a spring plate mounted on one of the bolts 50 and carrying at its free end a pin 52 which passes through an opening in the arm 48 and may be engaged with any one of a series of apertures 53 in the adjacent end member 20 of the reversible frame, whereby said reversible frame may be supported at any desired angle to the yoke 46 and with either end uppermost. 54 denotes a shaft journaled in the handle 47 and yoke 46 and provided with a knurled thumb nut or finger wheel 55 arranged in proximity to the handle 47, whereby said wheel or nut may be conveniently turned by the fingers of a hand grasping said handle. At its outer end the shaft 54 carries a gear 56 which meshes with a gear 57 secured to the lower end of an upright shaft 58 journaled in the arm 49 and carrying at its upper end a gear 59. 60 denotes gears meshing with the gears 41 and mounted to rotate freely inside the end member 20 on studs 61 secured in said end member. 62 denotes gears meshing with the gears 60 and having dished centers 63, which rotate freely in openings in the end member 20, and to the outer sides of which are secured, as by screws or rivets, gears 64. It will be seen that there are two gears 64, one corresponding to each roller 27, the uppermost of which, according to the position of the reversible frame, meshes with the gear 59. The gears 59 and 64, and preferably also for convenience the gears 56 and 57, are of the pin gear type shown in detail in Fig. 5 and comprising disks having peripheral series of radially projecting cylindrical pins. This type of gearing is particularly adapted to the conditions imposed upon the gears 59 and 64, namely, that of performing the function of bevel gears while capable of being readily swung into and out of engagement when the frame is reversed.

It will be understood that, with the parts in the positions shown in Figs. 1 and 4, rotation of the thumb wheel 55 is transmitted through the shafts 54 and 58 and gears 59, 64, 62, 60 and 41 to the uppermost roller 27, rotating said roller and feeding the strip upwardly as above explained. When the frame is reversed the gear 64 shown at the top in Figs. 1 and 4 is thrown out of mesh with the gear 59, and the gear 64 shown at the bottom in said figures brought into mesh therewith, whereupon operation of the thumb wheel 55 will cause rotation of the other roller 27 in order to feed the strip in the opposite direction in accordance with the requirements.

A modified form of apparatus is shown in Figs. 8 to 14. As shown in said figures the reversible frame comprises top and bottom members 65 connected by end members 66 which are in turn connected by tie rods 67 riveted or otherwise secured to said end members and upon which are loosely mounted rollers 79. The top and bottom members 65 are of a semi-cylindrical shape to provide housings for the strip rolls and are formed with contracted ends 68 which are received between in-turned edge flanges 69 on the end members 66. The spools or rollers 27 are received between spring pressed plungers 70, similar to the plungers 33 in the form of the invention first described, and rotary shafts 71, similar to the shafts 38 and provided with lugs 72 constituting dogs adapted to engage the slots 40 in the ends of the rollers 27, and corresponding in function to the dogs 39. 73 denotes friction washers on the shafts 71 and located at opposite sides of the adjacent end member 66, and 74 metallic washers mounted on said shafts. The inner one of each pair of washers 74 engages a shoulder 75 on the corresponding stud 71, and the outer washer 74 of each pair is engaged by a spring 76 interposed between said washer and a knurled thumb nut 77 secured to the outer end of the corresponding stud 71. The springs 76 are preferably inclosed by housings 78. The operation of this form of the invention is substantially the same as that of the form first described.

As illustrated in Fig. 14, the reading strip 29 is led from the lowermost spool 27, upon which it is wound, over the lower guide roller 79 and is engaged in the slot 28 in the upper spool 27, as shown in full lines in said figure. After the strip has been completely wound upon the upper spool 27, the lower end thereof is detached from the lower spool 27, is passed over the upper guide roller 79 and is reëngaged with the lower spool 27, as shown in dotted lines in Fig. 14, whereupon the frame is reversed and the strip fed in the opposite direction, as will be obvious.

In Fig. 8 is shown convenient means whereby the reversible reading frame may be supported from any object 80, such as the arm of a chair, a table or the like. 81 denotes a clamp or base of any suitable character adapted to be secured to or to rest upon the table or chair arm 80, and in which an angular bracket arm 82 is adjustably held by means of a clamp screw 83. 84 denotes a hollow arm which telescopes with the arm 82 and is adjustably secured thereto by a clamping collar 85 which surrounds the slotted lower end of said arm 84. Secured to the upper end of the arm 84 is a head 86 pivoted, by means of a screw or stud 87, to one of the end members 66 of the reversible frame. 88 denotes a spring secured to the outer face of the head 86 and having a pin 89 which passes through an opening in said head and which may be engaged with any one of a series of apertures 90 in the end member 66, whereby the frame may be held in any desired position.

The construction shown in Figs. 8 and 13 is such as to provide for the operation of the rollers by direct manipulation of the thumb nuts 77, although, if preferred, any suitable mechanism may be employed for rotating the shafts 71.

It will be seen that by arranging reading matter in accordance with the present invention rather than in bound volumes, as has heretofore been the practice, a number of important advantages are secured. In the first place by arranging the matter on a single continuous strip a great saving of paper is effected by reason of the elimination of the top and bottom margins required on a printed page. In the second place binding is dispensed with, while by the use of the holders above described and others operating upon the same principle which might be devised, the reading matter is presented to the reader in fully as convenient and attractive a form as in a bound volume. The expense of publication may therefore be diminished to a small fraction of that necessitated by the present forms of production, while the space required for the storage of any particular work is still further decreased, it being understood that a single holder or frame may be employed for use in connection with any number of rolls of reading matter, which may be furnished to the reader at trifling cost as compared to the cost of a bound volume, and several of which may be stored in the space heretofore required for a single volume containing the same amount of reading matter.

By reason of the disposition of the reading matter upon the strip and the use of the same in a reversible frame provided with a pair of rolls by means of which a strip is fed alternately in opposite directions to permit first one side and then the other to be read, it will be observed that when any particular work has been read through to the end the strip will have been automatically reeled up upon the spool from which it started, and will be in condition for immediate use again without any re-reeling whatsoever.

The term "reading matter" as herein used is, of course, to be understood as broad in its meaning and to include illustrations, diagrams, music, maps or any other similar matter written, printed, drawn, or otherwise inscribed or displayed upon the "reading" strip.

Having thus described our invention, we claim:

1. A reading roll comprising a strip having reading matter on both sides, said reading matter being oppositely disposed on the opposite sides of said strip, in combination with means for holding said strip and for feeding the same alternately in opposite directions to permit first one side and then the other to be read, and separate means for guiding said strip when fed in opposite directions.

2. A reading roll comprising a strip having reading matter on both sides, said reading matter being oppositely disposed on the opposite sides of said strip, in combination with a reversible frame and rollers in said frame for holding and feeding said strip, said rollers being operable to feed said strip in either direction, and separate means for guiding said strip when fed in opposite direction.

3. A reading device comprising a reading strip, a reading frame, rollers in said frame for holding and feeding said strip, a holder comprising a yoke having a pair of arms between which said frame is pivoted, a handle secured to said yoke, a spring secured to the outer side of one of said arms, and a locking pin secured to said spring and slidably mounted in said arm, said frame having a plurality of apertures to receive said pin.

4. A reading device comprising a reading strip, a reading frame, rollers in said frame for holding and feeding said strip, and alternatively operative means adjacent the opposite sides of said frame for guiding said strip.

5. A reading device comprising a strip having reading matter on both sides, said reading matter being oppositely disposed on the opposite sides of the strip, a reversible reading frame, rollers in said frame for holding and feeding said strip, said rollers being operable to feed said strip in either direction, and alternatively operative means adjacent the opposite sides of said frame for guiding said strip.

6. A reading device comprising a strip having reading matter on both sides, said reading matter being oppositely disposed on the opposite sides of said strip, a reversible reading frame, rollers in said frame for holding and feeding said strip, said rollers being operable to feed said strip in either direction, and combined guiding and backing plates arranged at opposite sides of said frame, said strip passing over one of said plates when fed in one direction and over the other of said plates when fed in the opposite direction.

7. A reading device comprising a reading strip, a reversible reading frame, rollers in said frame for holding and feeding said strip, a handle for said frame, and operating mechanism for said rollers operative in either position of said frame and having an operating member arranged adjacent said handle.

8. A reading device comprising a reading strip, a reading frame, rollers in said frame for holding and feeding said strip, a holder to which said frame is pivoted, a handle secured to said holder, and operating mechanism for said rollers including an operating gear, gears operatively connected with said rollers respectively and successively engaged with said operating gear as said holder is turned on its pivot, and an operating member arranged adjacent said handle.

9. A reading device comprising a reading strip, a reversible reading frame, rollers in said frame for holding and feeding said strip, and plates arranged adjacent the opposite sides of said frame and over which said strip passes between said rollers for guiding said strip, said plates being alternatively operative when said strip is fed in opposite directions.

10. A reading device comprising a reading strip, a reversible reading frame, rollers in said frame for holding and feeding said strip, a pair of friction washers connected with each of said rollers, the washers of each pair being arranged on opposite sides of a portion of said frame, and springs for forcing said washers into engagement with said frame.

11. A reading device comprising a reading strip, means for feeding said strip in opposite directions, and means for guiding said strip in different paths when fed in different directions.

12. A reading device comprising a strip having reading matter on both sides, said reading matter being oppositely disposed on the opposite sides of said strip, in combination which means for holding said strip and for feeding the same alternately in opposite directions to permit first one side and then the other to be read, and means for guiding said strip in different paths when fed in different directions.

13. A reading device comprising a reading strip, a reversible frame, means in said frame for feeding said strip, and means for guiding said strip in different paths with respect to said frame when said frame is in different positions.

14. A reading device comprising a strip having reading matter on both sides, said reading matter being oppositely disposed on the opposite sides of said strip, a reversible frame, means in said frame for feeding said strip, alternately in opposite directions when said frame is in opposite positions to permit first one side and then the other of said strip to be read, and means for guiding said strip in different paths when different sides thereof are being read.

15. A reading device comprising a reading strip, a reading frame, means in said frame for feeding said strip in opposite directions, and means for guiding said strip adjacent different sides of said frame when fed in different directions.

16. A reading device comprising a strip having reading matter on both sides, said reading matter being oppositely disposed on the opposite sides of said strip, a reversible frame, means in said frame for feeding said strip alternately in opposite directions when said frame is in opposite positions to permit first one side and then the other of said strip to be read, and means for guiding said strip in different paths adjacent opposite sides of said frame when different sides of said strip are being read.

17. A reading device comprising a plurality of means for feeding a reading strip from one to the other and vice versa, said device including means for guiding said strip in different paths with respect to the feeding means when fed to the several feeding means respectively.

18. A reading device comprising a frame and a plurality of means in said frame for feeding a reading strip from one to the other and vice versa, said device including means for guiding said strip in different paths with respect to said frame when fed to the several feeding means respectively.

19. A reading device comprising a roller frame and a plurality of rollers in said frame for holding and feeding a reading strip, said rollers being severally operable to feed said strip thereto, and said device including means for guiding said strip in different paths with respect to said rollers and frame when fed to the several rollers respectively.

In testimony whereof we affix our signatures each in the presence of two witnesses.

JOHN FEGER ANCONA.
JOHN FLINN ANCONA.

Witnesses to the signature of John Feger Ancona:
 HERBERT R. GREEN,
 JOHN F. GOODHART.

Witnesses to the signature of John Flinn Ancona:
 G. B. TUTHILL,
 E. D. ANCONA.

Copies of this patent may be obtained for five cents each, by addressing the "Commissioner of Patents, Washington, D. C."